(12) United States Patent
Tanikawa et al.

(10) Patent No.: US 8,660,405 B2
(45) Date of Patent: Feb. 25, 2014

(54) DATA PROCESSING DEVICE

(75) Inventors: Kentaro Tanikawa, Osaka (JP);
Masafumi Kouzuki, Osaka (JP); Kojiro Kawasaki, Osaka (JP); Shota Hario, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/813,700

(22) PCT Filed: Aug. 5, 2011

(86) PCT No.: PCT/JP2011/004475
§ 371 (c)(1),
(2), (4) Date: Feb. 1, 2013

(87) PCT Pub. No.: WO2012/017692
PCT Pub. Date: Feb. 9, 2012

(65) Prior Publication Data
US 2013/0129312 A1 May 23, 2013

(30) Foreign Application Priority Data
Aug. 6, 2010 (JP) .................................. 2010-177221

(51) Int. Cl.
*H04N 5/92* (2006.01)
*H04N 5/783* (2006.01)

(52) U.S. Cl.
USPC .......................................... 386/243; 386/351

(58) Field of Classification Search
USPC .................. 386/234, 235, 243, 248, 343, 351
See application file for complete search history.

(56) References Cited

U.S. PATENT DOCUMENTS

| 2005/0071885 A1 | 3/2005 | Matoba |
| 2005/0100321 A1 | 5/2005 | Koudo et al. |
| 2005/0124858 A1 | 6/2005 | Matsuzawa et al. |
| 2007/0101386 A1 | 5/2007 | Oranim et al. |
| 2007/0180382 A1* | 8/2007 | Kortum et al. ................ 715/716 |
| 2010/0014831 A1 | 1/2010 | Nakano |

(Continued)

FOREIGN PATENT DOCUMENTS

| JP | 2001-298686 A | 10/2001 |
| JP | 2003-069911 A | 3/2003 |

(Continued)

OTHER PUBLICATIONS

Supplementary European Search Report for corresponding European Application No. 11814323.9 dated Apr. 17, 2013.

(Continued)

*Primary Examiner* — Robert Chevalier
(74) *Attorney, Agent, or Firm* — Renner, Otto, Boisselle & Sklar, LLP

(57) ABSTRACT

The possibility that one who is not accustomed with manipulation may cause inadvertent alteration or deletion by using an easy-remote control is reduced.
A data processing apparatus includes a reception section for distinguishably receiving a first remote control signal sent from a first remote control and a second remote control signal sent from a second remote control; a processor for generating image data representing a list of contents by using, from a storage medium on which content-related information is recorded, information being read from the storage medium, such that image data representing a different list of contents is generated depending on whether the first remote control signal is received or the second remote control signal is received; and an output section for outputting the image data representing the list of contents.

15 Claims, 18 Drawing Sheets

(56) References Cited

U.S. PATENT DOCUMENTS

| | | |
|---|---|---|
| 2010/0095346 A1 | 4/2010 | Pal |
| 2010/0322591 A1 | 12/2010 | Takao et al. |
| 2011/0002593 A1 | 1/2011 | Takao et al. |

FOREIGN PATENT DOCUMENTS

| | | |
|---|---|---|
| JP | 2004-056160 A | 2/2004 |
| JP | 2006-094114 A | 4/2006 |
| JP | 2007-129659 A | 5/2007 |
| JP | 4038737 B2 | 11/2007 |
| JP | 2008-160412 A | 7/2008 |
| JP | 2009-081538 A | 4/2009 |
| JP | 2009-246849 A | 10/2009 |
| JP | 2010-028476 A | 2/2010 |

OTHER PUBLICATIONS

International Search Report for corresponding International Application No. PCT/JP2011/004457 mailed Sep. 13, 2011.

Form PCT/ISA/237 for corresponding International Application No. PCT/JP2011/004457 mailed Sep. 13, 2011 and partial English translation.

International Search Report for corresponding International Application No. PCT/JP2011/004475 mailed Sep. 13, 2011 (Previously listed on IDS filed on Feb. 1, 2013 submitted with application)

Form PCT/ISA/237 for corresponding International Application No. PCT/JP2011/004475 mailed Sep. 13, 2011 and partial English translation (Previously listed on IDS filed on Feb. 1, 2013 submitted with application).

* cited by examiner

FIG.6

| PROGRAM NAME | CHANNEL NAME | START TIME | END TIME | REMOTE CONTROL FLAG | STATE OF RECORDING |
|---|---|---|---|---|---|
| THE ROAD TO THE SEA | BS 161 | 7/1 15:00 | 7/1 15:30 | SIMPLE-REMOTE CONTROL | COMPLETED |
| NEWS | BS 101 | 7/1 19:00 | 7/1 19:30 | FULL-REMOTE CONTROL | COMPLETED |
| EVERYBODY, DON! | DTTV 011 | 7/2 15:00 | 7/2 15:30 | SIMPLE-REMOTE CONTROL | BEING RECORDED |
| NOH-KYOGEN PLAY ~KYOGEN PLAY "BON-SAN" | DTTV 021 | 7/2 15:00 | 7/2 15:30 | FULL-REMOTE CONTROL | BEING RECORDED |
| NEWS SPECIAL | DTTV 041 | 7/3 16:00 | 7/3 16:30 | SIMPLE-REMOTE CONTROL | SCHEDULED |
| ENGLISH CONVERSATION | DTTV 021 | 7/3 19:00 | 7/3 19:30 | FULL-REMOTE CONTROL | SCHEDULED |
| ⋯ | ⋯ | ⋯ | ⋯ | ⋯ | ⋯ |

LIST OF RECORDINGS (SHOW IN A CHUNK)　　　REMAINING AMOUNT 27:28 (DR)

502

ALL

| | | | |
|---|---|---|---|
| NOT WATCHED | 4/24 (SAT) | BS 161 | THE ROAD TO THE SEA |
| NOT WATCHED [MORE THAN ONE] | 4/28 (WED) | BS 101 | NEWS |
| NOT WATCHED 🔒 | 5/13 (THU) | DTTV 011 | CAPTION EVERYBODY, DON! |
| ▶ | 5/15 (SAT) | DTTV 021 | MULTI-LINGUAL NOH-KYOGEN PLAY ~KYOGEN PLAY "BON-SAN" ~NOH PLAY "FUNA |
| NOT WATCHED | 5/15 (SAT) | NEWS SPECIAL DTTV 041 CAPTION | START TIME 17:30  RECORDING TIME 1:20(HX) |
| NOT WATCHED | 5/17 (MON) | DTTV 021 | ENGLISH CONVERSATION |

LIST OF RECORDINGS

ALL

| | | |
|---|---|---|
| 5/15 (SAT) | DTTV 021 | MULTILINGUAL NOH-KYOGEN PLAY<br>~KYOGEN PLAY "BON-SAN" ~NOH PLAY "FUNABENKEI"<br>START TIME 17:30<br>RECORDING TIME<br>1 HOUR 20 MINUTES (HIGH IMAGE QUALITY) |
| 5/15 (SAT)<br>NOT WATCHED | NEWS SPECIAL<br>DTTV 041 CAPTION | |

REMAINING 5 HOURS 30 MINUTES
(HIGH IMAGE QUALITY)

SCHEDULING SCREEN

| | | | | | | | 801 |
|---|---|---|---|---|---|---|---|
| MAY, 17 (MON) 11:05~11:30 | DTTV 011-0 | HDD HX | HOME MEDICINE "SIGNS OF ILLNESSES THAT MAY BE OVERLOO... | | | RECOR-DABLE | PROGRAM SCHE-DULING |
| MAY, 24 (MON) 12:00~12:30 | DTTV 021 | HDD HX | NETWORK SOCIETY "TOO ADVANCED INFORMATION... [CAPTION] | | | RECOR-DABLE | PROGRAM SCHE-DULING |
| MAY, 24 (MON) 12:45~13:00 | DTTV 011-0 | HDD HX | [CAPTION] [D] SERIAL TELEVISION NOVEL DRAGONFLY (49)"... | EVERY WEEK | | RECOR-DABLE | PROGRAM SCHE-DULING |
| MAY, 24 (MON) 14:00~15:00 | DTTV 021 | HDD HB | ENJOY CLASSICS ~NOH-KYOGEN PLAY "LEARN TO ENJO... | | | RECOR-DABLE | PROGRAM SCHE-DULING |
| MAY, 17 (MON) 15:50~16:48 | DTTV 101 | HDD HB | NO WAY! [RERUN] [CAPTION] | OVER-LAPPED | (!) | RECOR-DABLE | PROGRAM SCHE-DULING |
| . . . . . | . . . . . | . . . . . | . . . . . | . . . . . | . . . . . | . . . . . | . . . . . |

FIG.12

| SCHEDULING SCREEN | | | | | | | | |
|---|---|---|---|---|---|---|---|---|
| MAY, 24 (MON) 12:45~13:00 | DTTV 011-0 | HIGH IMAGE QUALITY | CAPTION D SERIAL TELEVISION NOVEL DRAGONFLY (49)"... | EVERY WEEK | | RECOR-DABLE | | |
| . . . . . | . . . . . | . . . . . | . . . . . | . . . . . | . . . . . | . . . . . | . . . . . | |

DATA PROCESSING DEVICE

TECHNICAL FIELD

The present invention relates to an apparatus which can be manipulated by a user with a plurality of remote controls.

BACKGROUND ART

In recent years, a large number of digital home appliances are marketed. Most of such digital home appliances are usually packaged with at least one remote control. A user can manipulate each digital home appliance by using such a remote control.

Some conventional digital home appliances are packaged with a plurality of remote controls. For example, devices are known for which not only a usual remote control having buttons for enabling thorough manipulation of that device, but also a specialized remote control having a reduced number of buttons is provided. By using such a specialized remote control, because of it having fewer buttons, the user can readily select a desired function and manipulate the device.

The manufacturer of the device previously sets it so that, when a specific button on the specialized remote control is pressed, an application that is assigned to each button is activated. For example, when a LIST OF RECORDINGS button is pressed, a list-of-recordings application which shows a list of recorded programs is activated. When the list-of-recordings application is activated from the usual remote control, the user is able to utilize all functions. On the other hand, when the list-of-recordings application is activated from the specialized remote control, the user is only able to utilize functions that are manipulatable with the buttons existing on that remote control alone. The same is also true of any other function. For example, if a SKIP-30-SECONDS button does not exist on the specialized remote control, the user is not able to utilize a SKIP-30-SECONDS function when playing back a program. In another example where a DELETE button exists on the specialized remote control, the user is able to utilize a program deleting function on a list of recorded programs.

Patent Document 1 describes a reproduction apparatus provided with a plurality of remote controls. IN Patent Document 1, the reproduction apparatus switches displaying depending on whether a remote control signal is received from a first remote control or a remote control signal is received from a second remote control signal.

CITATION LIST

Patent Literature

[Patent Document 1] the specification of Japanese Patent No. 4038737

SUMMARY OF INVENTION

Technical Problem

However, the aforementioned conventional reproduction apparatus have the following problems.

In conventional reproduction apparatus, on an operating screen of each application, many functions are executable when a user performs a selection operation with the cursor buttons and ENTER button. Among these are included functions that alter program information, e.g., deletion and editing.

Therefore, there has been a possibility that, by using the specialized remote control, one who is not accustomed with manipulation may inadvertently alter or delete the program which someone else has recorded with the usual remote control, or scheduling information. Moreover, the manipulation screen (GUI: graphical user interface) of an application may have been difficult to understand for beginners or people in senior age.

The present invention has been made in view of the above problems, and an objective thereof is to provide a device or the like that displays a list (GUI) which allows a user to easily distinguish information concerning the contents that he or she is involved with, and which prevents inadvertent alteration or deletion of the information concerning the contents.

Solution to Problem

A data processing apparatus according to the present invention comprises: a reception section for distinguishably receiving a first remote control signal sent from a first remote control and a second remote control signal sent from a second remote control; a processor for generating image data representing a list of contents by using, from a storage medium on which content-related information is recorded, the information being read from the storage medium, such that image data representing a different list of contents is generated depending on whether the first remote control signal is received or the second remote control signal is received; and an output section for outputting the image data representing the list of contents.

The processor, when the first remote control signal is received, may generate the image data representing the list of contents by using information which is recorded based on a manipulation of the first remote control and a manipulation of the second remote control, and when the second remote control signal is received, generate the image data representing the list of contents by using information which is recorded based on a manipulation of the second remote control, from within the content-related information recorded on the storage medium.

Data of at least one content may be recorded on the storage medium as the content-related information; and the processor may generate image data representing a list of recorded contents.

When the storage medium contains a content which is recorded based on a manipulation of the second remote control, the processor having received the first remote control signal may generate image data distinguishably indicating that the content has been recorded based on a manipulation of the second remote control.

The processor may calculate information concerning an available remaining amount based on a total capacity and a used capacity of the storage medium, and when the first remote control signal is received, generate text information concerning the remaining amount, together with the image data representing the list of contents, and when the second remote control signal is received, generate image data representing information concerning the remaining amount, together with the image data representing the list of contents generated by using the information which is recorded based on a manipulation of the second remote control.

The processor may generate image data of a graph representing the information concerning the remaining amount.

The data processing apparatus may further comprise a recording section for recording a content onto the storage medium, wherein, during a period in which the recording section is recording a content onto the storage medium based on a manipulation of the first remote control, if the reception section receives a second remote control signal from the second remote control concerning a manipulation of stopping the recording of the content, the recording section may not stop the recording of the content.

During a period in which the recording section is recording a content onto the storage medium based on a manipulation of the first remote control, if the reception section receives a second remote control signal from the second remote control concerning a manipulation of stopping the recording of the content, the processor may generate image data indicating that the recording of the content is not stoppable.

Scheduling information for scheduled recording of a content may be recorded on the storage medium as the content-related information; and the processor may generate image data representing a list of scheduled recording of contents.

When the storage medium contains scheduling information which is recorded based on a manipulation of the second remote control, the processor having received the first remote control signal may generate image data distinguishably indicating that the scheduling information has been recorded based on a manipulation of the second remote control.

The storage medium may be a storage medium which is removable from the data processing apparatus.

At least one of the first remote control and the second remote control may be a computer device having installed therein an application which enables manipulation of the data processing apparatus, the computer device being capable of communicating with the data processing apparatus.

From a respective computer device, the reception section may receive identification information making the computer device uniquely identifiable and a remote control signal; and by using the identification information, the processor may determine whether the first remote control signal is received or the second remote control signal is received.

The data processing apparatus may be connected to a server via a network, the server keeping under management a storage medium on which the content-related information is recorded; and the processor may generate the image data by using the content-related information read from the storage medium by the server.

Another data processing apparatus according to the present invention comprises: a reception section for receiving a remote control signal from a remote control which is switchable between a first remote control function of functioning as a first remote control and a second remote control function of functioning as a second remote control, the reception section distinguishably receiving a first remote control signal that is sent while the first remote control function is selected and a second remote control signal that is sent while the second remote control function is selected; a processor for generating image data representing a list of contents by using, from a storage medium on which content-related information is recorded, the information being read from the storage medium, such that image data representing a different list of contents is generated depending on whether the first remote control signal is received or the second remote control signal is received; and an output section for outputting the image data representing the list of contents.

Advantageous Effects of Invention

According to the present invention, it is possible to reduce the possibility that one who is not accustomed with manipulation may inadvertently alter or delete setting particulars or audiorecorded or videorecorded contents by using an easy-remote control.

BRIEF DESCRIPTION OF DRAWINGS

FIG. 6 A diagram showing program additional information 401 which is recorded in a program information recording section 204.

FIG. 7 A diagram showing a list of recorded programs that is displayed as a result of executing a list-of-recordings application for the full-remote control.

FIG. 9 A diagram showing a list of recorded programs that is displayed as a result of executing a list-of-recordings application for the simple-remote control.

FIG. 11 A diagram showing a list of programs scheduled to be recorded that is displayed as a result of executing a list-of-scheduling application for the full-remote control.

FIG. 12 A diagram showing a list of programs scheduled to be recorded that is displayed as a result of executing a list-of-scheduling application for the simple-remote control.

DESCRIPTION OF EMBODIMENTS

Figure 1:
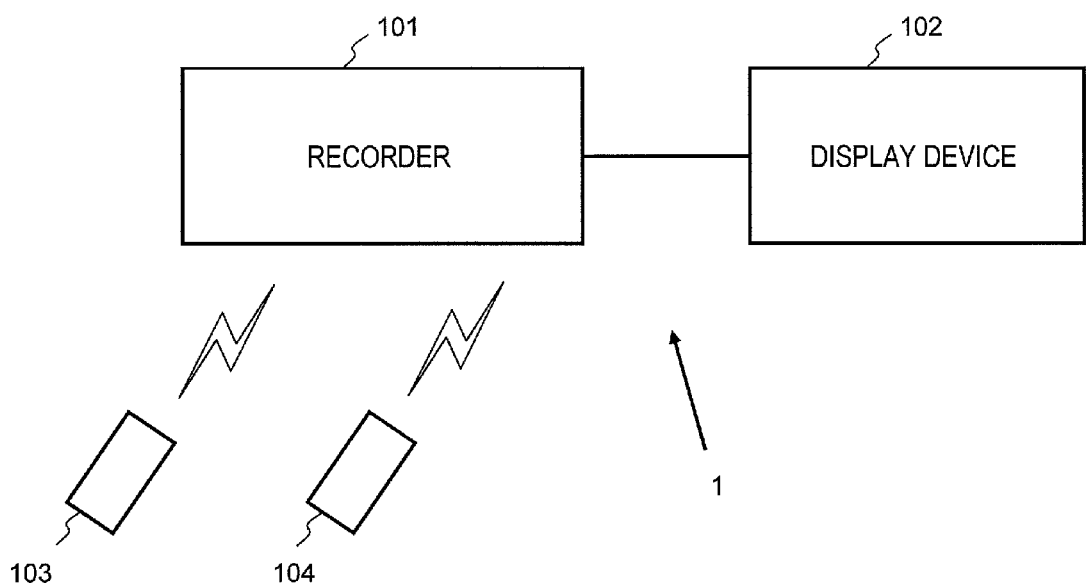
FIG. 1 A diagram showing the construction of a video system 1 according to an embodiment of the present invention.

FIG. 1 shows the construction of a video system 1 according to an embodiment of the present invention. The video system 1 includes a recorder 101 and a display device 102.

The recorder 101 has a recording function and a reproduction function of contents. A content is a program of television broadcasting, for example. The recorder 101 is a Blu-ray (BD) recorder with an internal hard disk drive (HDD), a BD recorder, or a HDD recorder, for example. In the following description, it is assumed that the recorder 101 is a BD recorder with an internal HDD.

The recorder 101 is a computer system which is composed of a microprocessor, a ROM, a RAM, a hard disk unit, and the like. Computer programs are stored in the ROM or the hard disk unit. As the microprocessor operates in accordance with the computer programs, the recorder 101 accomplishes its functions described later.

The recorder 101 retains content-related information in at least one of the internal RAM, the flash memory, and the hard disk unit thereof. In the case where a content has been recorded on the hard disk unit, content-related information refers to the data of that content. In the case where scheduled recording has been set, it refers to that piece of scheduling information being stored on the RAM or the flash memory.

The recorder 101 records onto the HDD a program which has been scheduled by a user who manipulates a remote control. It also shows a list of, or plays back, programs which have been recorded through remote control manipulations by the user.

Figure 2:
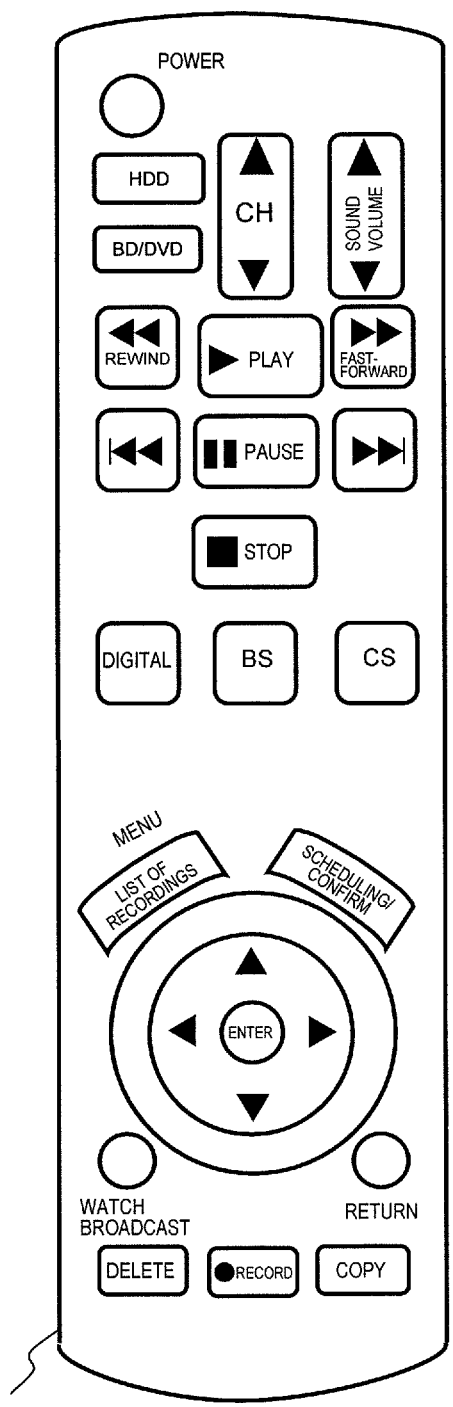
FIG. 2 A diagram showing an example of a full-remote control 103.
Figure 3:
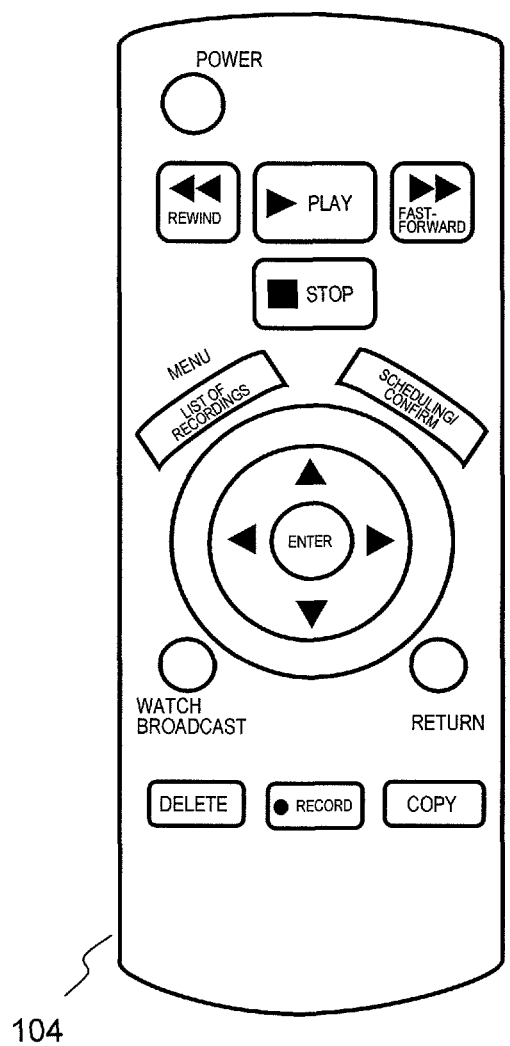
FIG. 3 A diagram showing an example of a simple-remote control.

A remote control manipulation by the user is to be executed with a full-remote control 103 or a simple-remote control 104. The simple-remote control 104 has fewer buttons than does the full-remote control 103. FIG. 2 shows an example of the full-remote control 103. FIG. 3 shows an example of the simple-remote control. It is assumed that each remote control communicates with the recorder 101 via infrared, for example. However, they may communicate with the recorder 101 via a radiowave signal (e.g. 2.4 GHz band).

The display device 102 is connected to the recorder 101, and outputs screen data, a video signal, and an audio signal which are output from the recorder 101, in the form of video or audio. The screen data may be a list of recorded programs, or a list of scheduled programs, for example.

Figure 4:
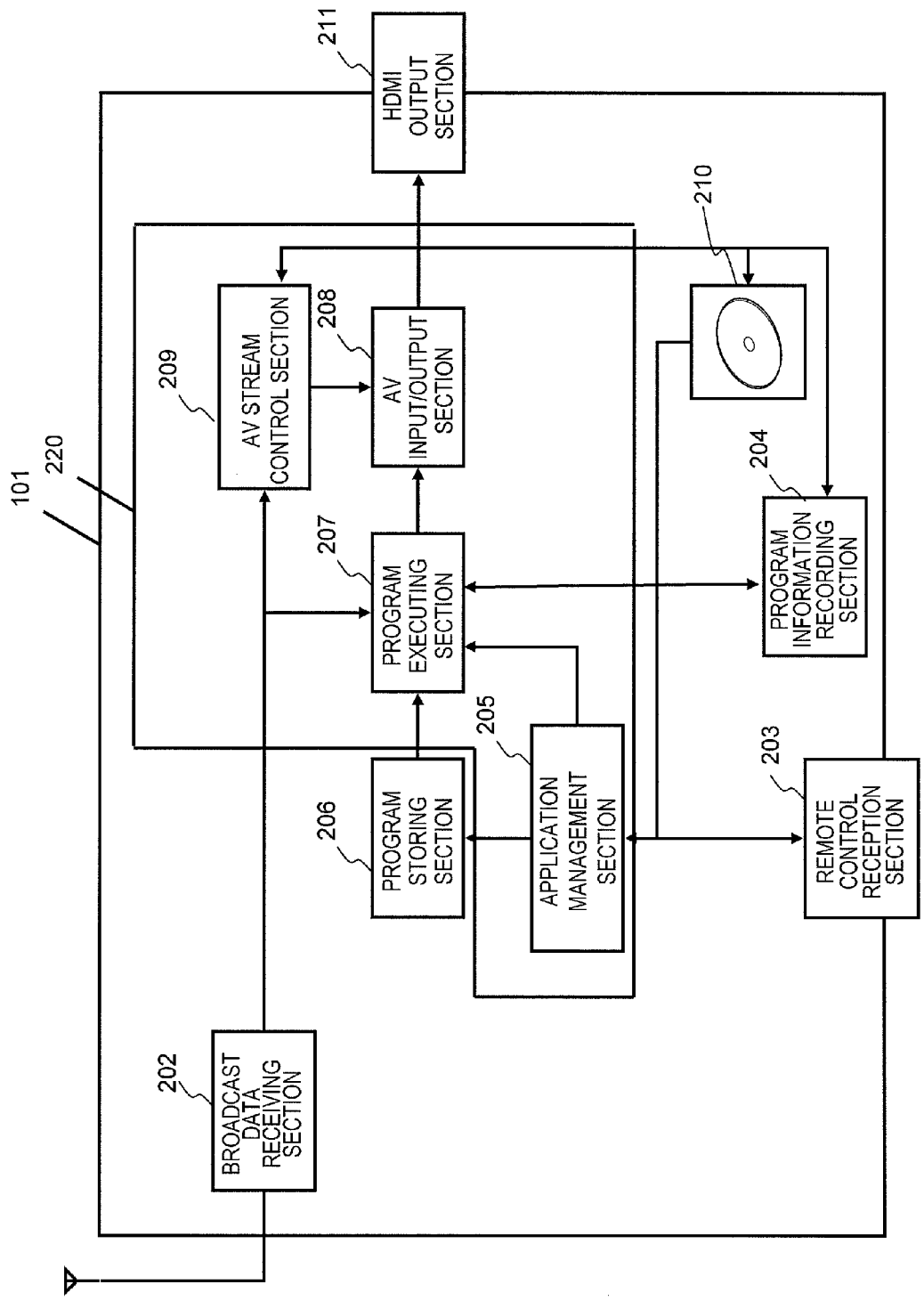
FIG. 4 A diagram showing the internal construction of a recorder 101.

FIG. 4 shows an internal construction for the recorder 101.

The recorder 101 includes a broadcast data receiving section 202, a remote control reception section 203, a program information recording section 204, an application management section 205, a program storing section 206, a program executing section 207, an AV input/output section 208, an AV stream control section 209, a medium control section 210, and an HDMI output section 211.

Among these, the application management section 205, the program executing section 207, the AV input/output section 208, and the AV stream control section 209, for example, are implemented by a processor (CPU) 220.

The broadcast data receiving section 202 is a tuner. The broadcast data receiving section 202 receives program additional information and program data. Program additional information is a program name, a broadcast start time, a broadcast end time, a channel number, and the like, for example. Program data is the video data and/or audio data of a program. Note that the received data (program additional information, program data) may be not only data which is transmitted by using a broadcast wave, but also data which is transmitted across communication lines such as the Internet.

The remote control reception section 203 receives a remote control signal (remote control code) from the full-remote control 103 or the simple-remote control 104, and sends the received remote control code to the application management section 205.

Based on the received remote control code, the application management section 205 refers to a remote control code table, and determines which function has been designated for execution. Then, it identifies a program that corresponds to the designated function, and determines which program is to be read from among the application programs which are stored in the program storing section 206 described later. The application management section 205 reads the determined application program. The application program is sent to the program executing section 207 for execution. Hereinafter, for simplification, "application programs" will be simply referred to as "applications".

Figure 5:
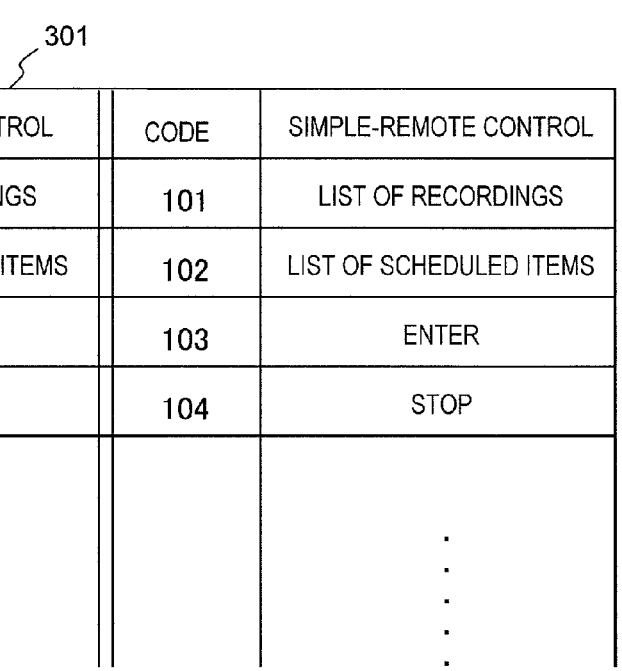
FIG. 5 A diagram showing a remote control code table 301 which is used by an application management section 205.

FIG. 5 shows a remote control code table 301 which is used by the application management section 205.

In the present embodiment, for at least one of the functions which are manipulatable with the full-remote control 103 and the simple-remote control 104, the remote control code(s) on the full-remote control 103 is different from the remote control code(s) on the simple-remote control 104. This also applies to any button that shares the same name on the remote controls. For example, as shown in FIG. 5, looking at the button having the name "LIST OF RECORDINGS", a remote control code "1" may be assigned to the full-remote control 103, while a remote control code "101" may be assigned to the simple-remote control 104. Thus, for the buttons of the same name of "LIST OF RECORDINGS", different remote control codes are assigned to the full-remote control 103 and the simple-remote control 104. Therefore, the recorder 101 is able to distinguish whether the received remote control signal has been sent from the full-remote control 103 or sent from the simple-remote control 104.

Depending on each button of the remote control code from the full-remote control 103 and the simple-remote control 104, the application management section 205 changes the application to be activated, or the conditions under which the application operates. In the aforementioned example, even if the same "LIST OF RECORDINGS" button is pressed, different applications will be executed, or the conditions under which the application operates will be varied, because of different remote control codes being assigned.

FIG. 4 is referred to again.

The program storing section 206 stores applications which operate on the recorder 101.

By operating via execution of an application of the recorder 101, the program executing section 207 accomplishes a programmed function.

The AV stream control section causes the program data received at the broadcast data receiving section 202 to be recorded to the program information recording section 204. Moreover, it reads program data which is recorded in the program information recording section 204 to generate a video signal and/or audio signal.

The program information recording section 204 records program data and program additional information onto the internal RAM or flash memory.

FIG. 6 shows program additional information 401 which is recorded in the program information recording section 204.

The program additional information includes information of a program name, a broadcast start time, a broadcast end time, a channel number, a remote control flag 402, and a state of recording 403. The remote control flag 402 is a flag indicating whether the user manipulation has occurred on the full-remote control 103 or the simple-remote control 104.

When a program is scheduled for recording by a scheduling application which has been activated from the simple-remote control 104, the remote control flag for that program takes the value "simple-remote control".

When a program is scheduled for recording by a scheduling application which has been activated from the full-remote control 103, the remote control flag for that program takes the value "full-remote control".

When recording of the scheduled program is completed, the value of the state of recording 403 of that program changes from "scheduled" to "completed". It is "being recorded" during recording.

Note that including a recording destination attribute in the program additional information will make it possible to keep information of different recording destination drives under respective management, e.g., HDD, BD/DVD, SD, or USB.

The AV input/output section 208 shown in FIG. 4 receives screen data which the program executing section 207 has generated by executing the application, and also receives the video signal and/or audio signal generated by the AV stream control section 209. Based on an instruction from the program executing section 207 having executed the application, the AV input/output section 208 switches between displaying of screen data only, displaying of an AV stream only, or merged displaying of the screen data and AV stream, which is output to the display device 102 via the HDMI output section 211.

The medium control section 210 reads program data from a non-internal medium (external medium), e.g., a BD/DVD, an SD, or a USB-connectable storage medium, or writes program data to an external medium. As a result, recording and/or playback of a program on an external medium is realized. Moreover, upon insertion or removal of a medium, the medium control section 210 notifies the application management section 205 of the insertion of the medium or removal of the medium.

Hereinafter, Embodiments 1 to 5 of the present invention will each be described.

Embodiment 1

Figure 8:
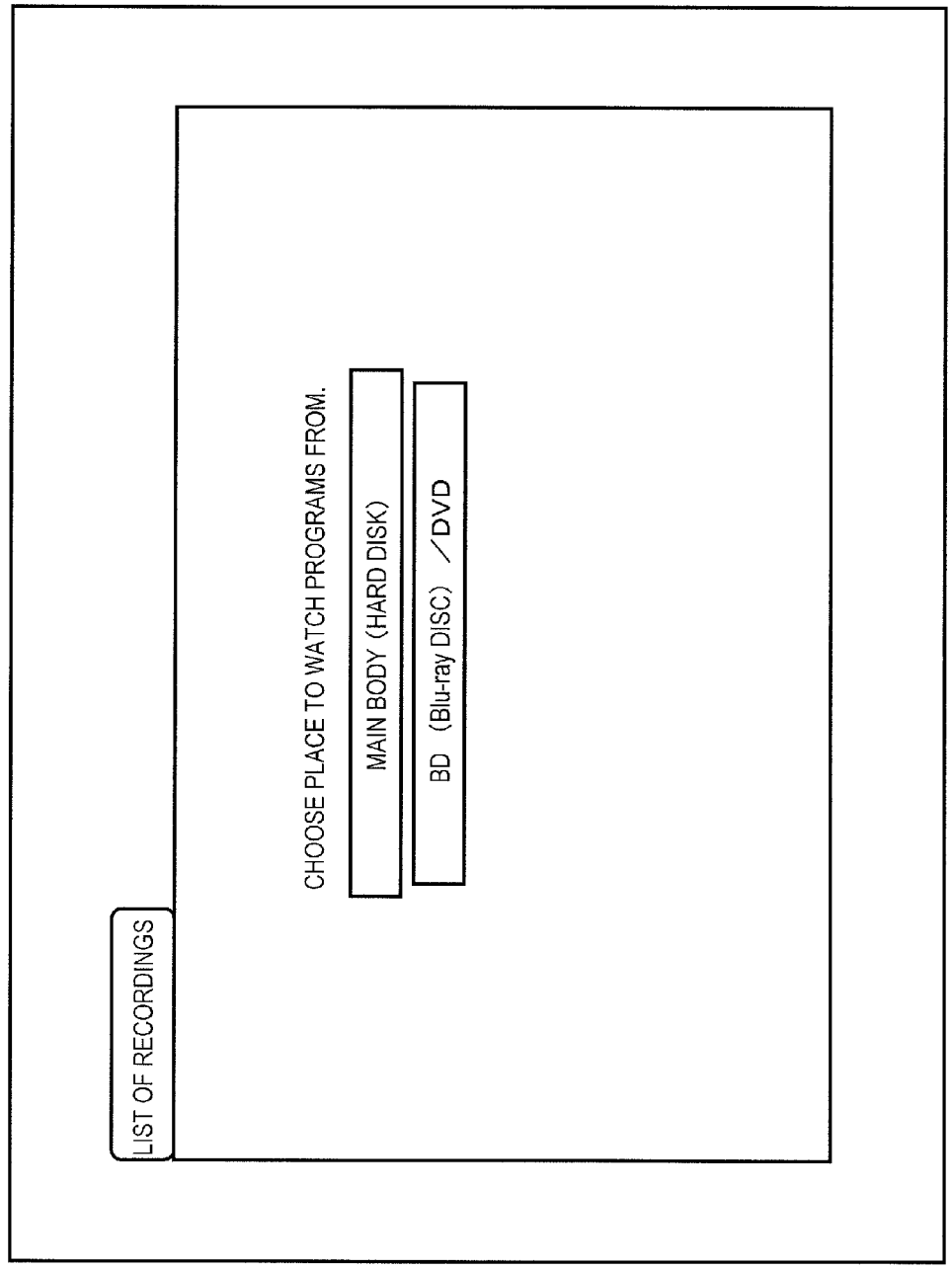
FIG. 8 A diagram showing an exemplary indication of a drive selection panel which is generated by a list-of-recordings application for the simple-remote control.

FIGS. 7 to 9 show exemplary indications according to the first embodiment. Hereinafter, exemplary indications when using the full-remote control 103 will be first described, and then exemplary indications when using the simple-remote control 104 will be described.

Indications by a List-of-Recordings Application Based on an Instruction from the Full-Remote Control 103

When a "LIST OF RECORDINGS" button on the full-remote control 103 is pressed through a user manipulation, the full-remote control 103 outputs a remote control code "1" (FIG. 5) corresponding to the "LIST OF RECORDINGS" button on the full-remote control 103. The remote control reception section 203 receives this remote control code, and sends the received remote control code to the application management section 205. By using the remote control code table 301, the application management section 205 recognizes that the user manipulation has been made on the full-remote control 103. Next, the application management section 205 reads a list-of-recordings application for the full-remote control from the program storing section 206, and the program executing section 207 executing that program executes an operation concerning a "LIST OF RECORDINGS" function as programmed.

The list-of-recordings application for the full-remote control is an application which shows a list of recorded programs. This application acquires program additional information 401 (FIG. 6) which is recorded in the program information recording section 204, and extracts only those pieces of program information whose state of recording 403 has the value "completed" or "being recorded". As a result, this application generates screen data for showing a list of all recorded programs. The generated screen data is output to the display device 102 by the AV input/output section 208.

FIG. 7 shows a list of recorded programs that is displayed as a result of executing the list-of-recordings application for the full-remote control. In FIG. 7, various information concerning the recorded programs, e.g., information of the dates and times of recordings, channels, and program names, is displayed.

Note that the list-of-recordings application employs different indications depending on whether the value of the remote control flag is "full-remote control" or "simple-remote control" when acquiring the program additional information 401 for displaying the recorded program information. For example, an icon for providing distinction over other programs is added to any indication of a program whose remote control flag has the value "simple-remote control", i.e., a program which has been recorded by using the simple-remote control. In the example shown in FIG. 7, an icon 501 is displayed if the flag value is indicative of the simple-remote control.

Moreover, the list of recorded programs shown in FIG. 7 contains a numerical indication 502 of a remaining amount, which represents how much more time programs can be recorded for in the HDD. The list-of-recordings application calculates the value to be displayed by the following method.

The remaining amount="overall capacity of HDD (as converted into time)"

"a totaled capacity of recorded programs in whose program additional information 401 the state of recording 403 has the value "completed" or "being recorded" (as converted into time)"

In other words, the area of programs which have already been recorded, and the area to be used by programs which are being recorded are defined as a used area, whereas the other area is defined as an unused area.

Indications by a List-of-Recordings Application Based on an Instruction from the Simple-Remote Control When a "LIST OF RECORDINGS" button on the simple-remote control 104 is pressed through a user manipulation, the simple-remote control 104 outputs a remote control code "101" (FIG. 5) corresponding to the "LIST OF RECORDINGS" button on the simple-remote control 104. The remote control reception section 203 receives this remote control code, and sends the received remote control code to the application management section 205. By using the remote control code table 301, the application management section 205 recognizes that the user manipulation has been made on the simple-remote control 104. Next, the application management section 205 reads a list-of-recordings application for the simple-remote control from the program storing section 206, and the program executing section 207 executing that program executes an operation concerning a "LIST OF RECORDINGS" function as programmed. As a result, a list as shown in FIG. 8 is displayed.

FIG. 8 is an exemplary indication of a drive selection panel which is generated by the list-of-recordings application for the simple-remote control for allowing the user to select either a HDD or a BD/DVD. When the user selects one of the drives from the drive selection panel, the list-of-recordings application for the simple-remote control generates screen data of a listing of programs that are recorded on the drive which has been selected by the user.

For example, if the user selects the HDD, list-of-recordings application for the simple-remote control acquires program additional information 401 which is recorded in the program information recording section 204, and extracts only those pieces of program information whose state of recording 403 has the value "completed" or "being recorded" and whose remote control flag has the value "simple-remote control". As a result, it generates screen data for showing a list of only those programs which are recorded with the simple-remote control. In other words, only a list of the programs for which the icon 501 is indicated in FIG. 7 is shown. The generated screen data is output to the display device 102 by the AV input/output section 208.

FIG. 9 shows a list of recorded programs that is displayed as a result of executing the list-of-recordings application for the simple-remote control. The program which are displayed are those programs for which the icon 501 was indicated. Note that various information concerning each program has identical substance to the displayed substance (FIG. 7) of when using the full-remote control.

As shown in FIG. 9, in a displayed list of recordings using the simple-remote control, no information of the recorded programs obtained by using the full-remote control is displayed. One who is not accustomed with manipulation only needs to use the simple-remote control for manipulation to prevent himself or herself from inadvertently deleting or editing recorded programs of a user (another person) of the full-remote control.

The list of recorded programs which is displayed by the list-of-recordings application for the simple-remote control also contains an indication 702 of a remaining amount, which represents how much more time programs can be recorded for in the HDD. However, the indication 702 is different from the indication 502 in the displayed substance of when using the full-remote control (FIG. 7). Specifically, the indication 502 when using the full-remote control (FIG. 7) represents remaining time with numerical values alone, whereas the indication 702 when using the simple-remote control represents remaining time with not only numerical values but also a graph. Moreover, the numerical values of the remaining time included in the indication 702 when using the simple-remote control are calculated by taking into consideration, in addition to the amount of time hitherto used for recording, the amount of time of programs that are currently scheduled. The specific method of calculation will be described later.

In the graph shown in FIG. 9, within an indication 702a of the recordable time when no recording has been done at al, an indication 702b of the amount of time hitherto used for recording plus the amount of time of scheduled programs is indicated in superposition. This graph lets one know how much recording capacity is to be consumed by the recording up to the present and by the scheduled programs, thus showing at a glance how much longer recording is possible.

The reason why the indication 502 when using the full-remote control and the indication 702 when using the simple-remote control are made different is that a user of the simple-remote control is often using the simple-remote control for the purpose of being able to exploit only the basic functions of the recorder 101 through simple manipulations, which presumably makes preferable an intuitive grasp of a recordable time that also takes the scheduled programs into consideration.

The value to be displayed is calculated by the following method.

The remaining amount="overall capacity of HDD (as converted into time)"

a totaled capacity of recorded programs in whose program additional information 401 the state of recording 403 has the value "completed" or "being recorded" (as converted into time)

a totaled capacity of recorded programs in whose program additional information 401 the state of recording 403 has the value "scheduled" (as converted into time) In other words, the area of programs which have already been recorded, the area to be used by programs which are being recorded, and the area to be used by scheduled programs are defined as a used area, whereas the other area is defined as an unused area.

Figure 10:
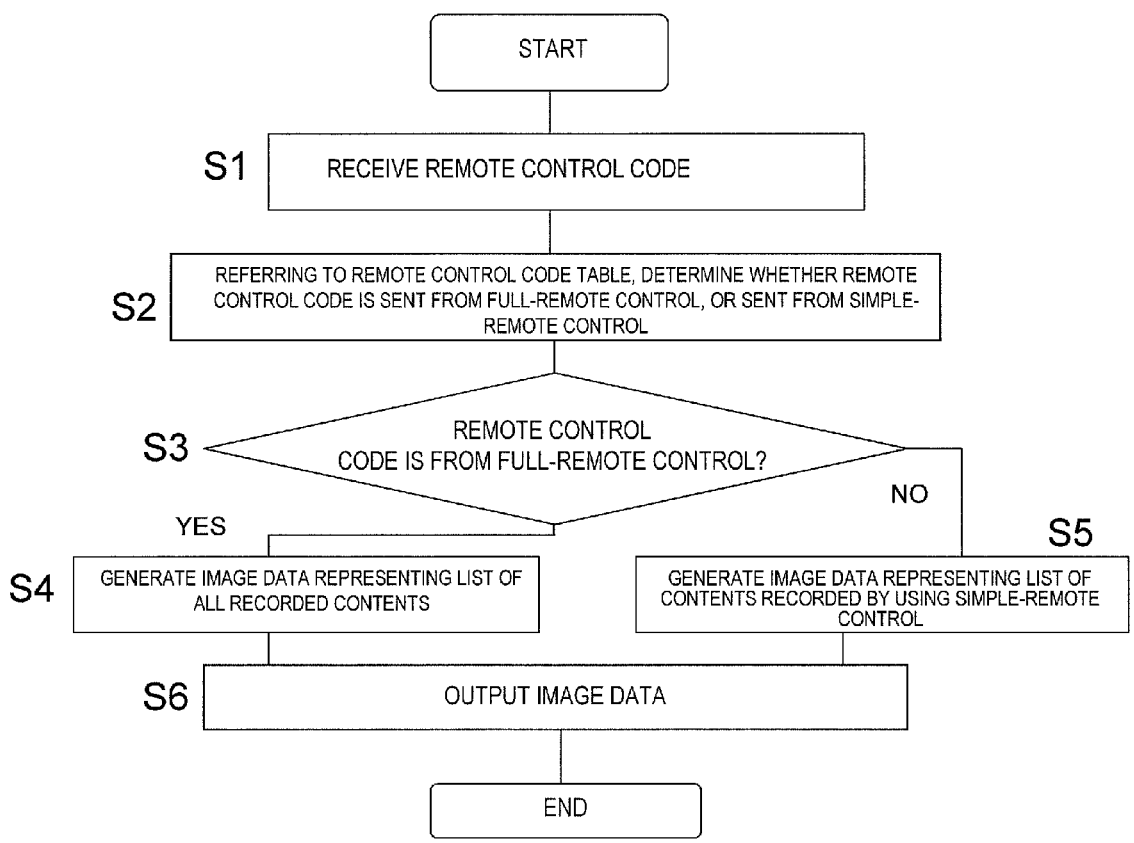
FIG. 10 A flowchart showing a procedure of processing by the recorder 101.

FIG. 10 is a flowchart showing a procedure of processing by the recorder 101.

At step S1, the remote control reception section 203 receives a remote control code.

At step S2, by referring to the remote control code table 301, the application management section 205 determines whether the remote control code has been sent from the full-remote control 103 or sent from the simple-remote control 104. If it is determined that the remote control code has been sent from the full-remote control 103, the process proceeds to step S4. If not, the process proceeds to step S5 because the remote control code has been sent from the simple-remote control 104.

At step S4, the program executing section 207 executes the application for the full-remote control to generate an image data indicating a list of all recorded contents.

On the other hand, at step S5, the program executing section 207 executes the application for the simple-remote control to generate image data indicating a list of contents which have been recorded by using the simple-remote control 104.

Then, at step S6, the AV input/output section 208 outputs the generated image data to the display device 102 via the HDMI output section 211. In this manner, different images are displayed depending on the remote control type.

Thus, displaying only those programs which have been recorded with the simple-remote control in the list-of-recordings application for the simple-remote control makes it easier for the user to find a desired program. Moreover, since it is a special-purpose application, manipulation is expected to become further simpler and easier to understand, based on limited functions and items of indications.

Moreover, by allowing only those programs which have been recorded with the simple-remote control to be displayed in the list-of-recordings application for the simple-remote control, it becomes possible to prevent a user of the simple-remote control from inadvertently deleting recorded programs of a user of the full-remote control.

Moreover, by allowing those programs which have been recorded on the simple-remote control to be displayed with a distinguishing icon in the list-of-recordings application of the full-remote control, it becomes possible to prevent a user of the full-remote control from inadvertently deleting recorded programs of a user of the simple-remote control.

Moreover, by including the totaled capacity of the scheduled programs in the remaining amount calculation by the list-of-recordings application for the simple-remote control, it becomes possible to prevent a scheduled item of a user of the full-remote control from failing to be executed due to an insufficiency of remaining amount that is caused by scheduled items of a user of the simple-remote control.

Embodiment 2

Embodiment 1 has illustrated a recorder which varies the listing of recorded programs depending on the remote control type.

The present embodiment will illustrate a recorder which varies a listing of scheduled recording, rather than recorded programs.

FIG. 11 and FIG. 12 show exemplary indications according to the present embodiment. Hereinafter, exemplary indications when using the full-remote control 103 will be first described, and then exemplary indications when using the simple-remote control 104 will be described.

Indications by a List-of-Scheduling Application Based on an Instruction from the Full-Remote Control When a "LIST OF SCHEDULINGS" button on the full-remote control 103 is pressed through a user manipulation, the full-remote control 103 outputs a remote control code "2" corresponding to the "LIST OF SCHEDULINGS" button on the full-remote control 103. The remote control reception section 203 receives this remote control code, and sends the received remote control code to the application management section 205. By using the remote control code table 301, the application management section 205 recognizes that the user manipulation has been made on the full-remote control 103. Next, the application management section 205 reads a list-of-scheduling application for the full-remote control from the program storing section 206, and the program executing section 207 executing that application executes an operation concerning a "LIST OF SCHEDULINGS" function as programmed.

The list-of-scheduling application for the full-remote control is an application for showing a list of scheduled programs. This application acquires program additional information 401 which is recorded in the program information recording section 204, and extracts only those pieces of program information whose state of recording 403 has the value "scheduled" or "being recorded". As a result, this application generates screen data for showing a list of all scheduled programs. The generated screen data is output to the display device 102 by the AV input/output section 208.

FIG. 11 shows a list of programs scheduled to be recorded that is displayed as a result of executing the list-of-scheduling application for the full-remote control.

Note that the list-of-scheduling application employs different indications depending on whether the value of the remote control flag is "full-remote control" or "simple-remote control" when acquiring the program additional information 401 for displaying the scheduled program information. For example, an icon for providing distinction over other programs is added to any indication of a scheduled item whose remote control flag has the value "simple-remote control", i.e., a scheduled recording which has been made by using the simple-remote control. In the example shown in FIG. 11, an icon 801 is displayed if the flag value is indicative of the simple-remote control.

Indications by a List-of-Scheduling Application Based on an Instruction from the Simple-Remote Control When a "LIST OF SCHEDULINGS" button on the simple-remote control 104 is pressed through a user manipulation, the simple-remote control 104 outputs a remote control code "102" (FIG. 5) corresponding to the "LIST OF SCHEDULINGS" button on the simple-remote control 104. The remote control reception section 203 receives this remote control code, and sends the received remote control code to the application management section 205. By using the remote control code table 301, the application management section 205 recognizes that the user manipulation has been made on the simple-remote control 104. Next, the application management section 205 reads a list-of-scheduling application for the simple-remote control from the program storing section 206, and the program executing section 207 executing that program executes an operation concerning a "LIST OF SCHEDULINGS" function as programmed. As a result, a list as shown in FIG. 12 is displayed.

The list-of-scheduling application for the simple-remote control is an application for showing a list of scheduled programs. The list-of-scheduling application for the simple-remote control acquires program additional information 401 which is recorded in the program information recording section 204, and extracts only those pieces of program information whose state of recording 403 has the value "scheduled" or "being recorded" and whose remote control flag has the value "simple-remote control". As a result, it generates screen data for showing a list of only those programs which have been scheduled on the simple-remote control. In other words, only a list of scheduled items for which the icon 801 is indicated in FIG. 11 is shown. The generated screen data is output to the display device 102 by the AV input/output section 208.

FIG. 12 shows list of programs scheduled to be recorded that is displayed as a result of executing the list-of-scheduling application for the simple-remote control.

Note that the operation of the recorder 101 according to the present embodiment is generally identical to FIG. 10; the list of recorded contents should now read a list of scheduled items. Therefore, any description based on a flowchart is omitted.

Thus, displaying only those programs which have been scheduled with the simple-remote control in the list-of-scheduling application for the simple-remote control makes it easer for the user to find desired scheduled items. Moreover, since it is a special-purpose application, manipulation is expected to become further simpler and easier to understand, based on limited functions and items of indications.

Moreover, displaying only those programs which have been scheduled with the simple-remote control in the list-of-scheduling application for the simple-remote control prevents a user of the simple-remote control from inadvertently deleting scheduled items of a user of the full-remote control.

By allowing those programs which have been scheduled on the simple-remote control to be displayed with a distinguishing icon in the list-of-scheduling application for the full-remote control, it becomes possible to prevent a user of the full-remote control from inadvertently deleting scheduled items of a user of the simple-remote control.

Embodiment 3

Figure 13A:
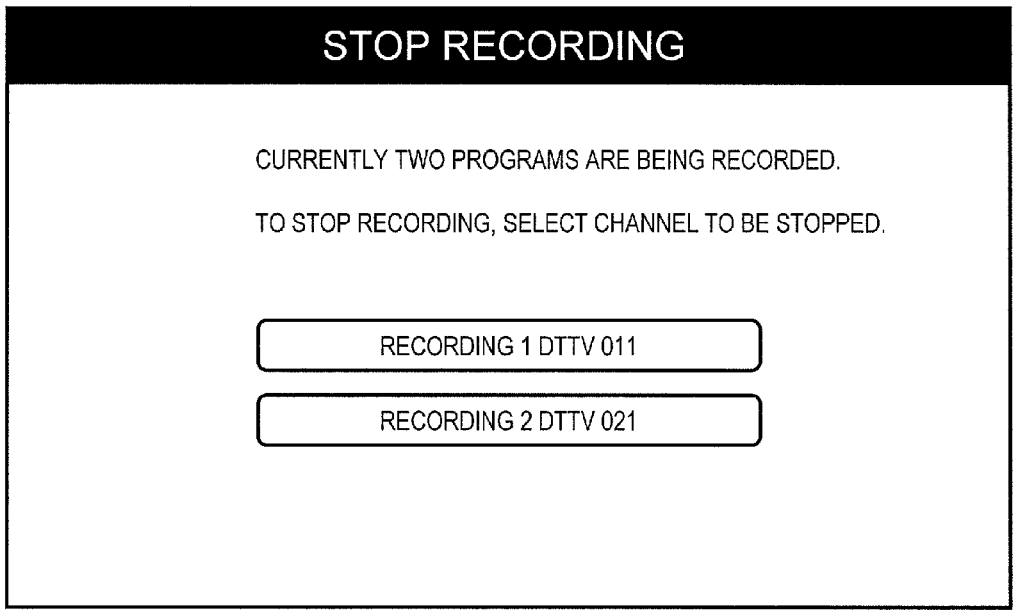
FIG. 13A A diagram showing an example of a panel which displays program information.
Figure 13B:
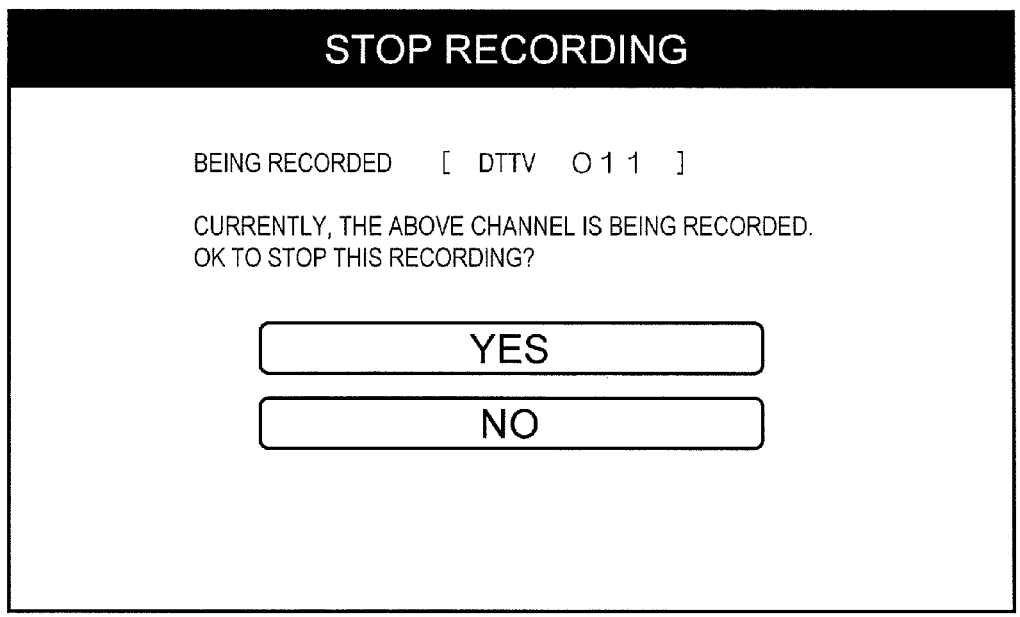
FIG. 13B A diagram showing an example of a panel which displays program information.
Figure 13C:
FIG. 13C A diagram showing an example of a panel which displays program information.

FIGS. 13A to FIG. 13C show exemplary indications according to a third embodiment.

When recording of a scheduled program or recording of a program which is being viewed is started, the application management section 205 of the recorder 101 reads a recording application from the program storing section 206, and the program executing section 207 executing that application executes a recording process of the program as programmed.

The recording process refers to a process in which the AV stream control section 209 records program data, which has been received by the broadcast data receiving section 202, to the program information recording section 204 as a recorded program. In the recording process, the AV stream control section 209 records the program additional information received by the broadcast data receiving section 202 to the program information recording section 204. At that time, the value of the state of recording 403 (FIG. 6) of the recorded program in the program additional information 401 is updated to "being recorded".

In the present embodiment, it is assumed that the recorder 101 is capable of simultaneously recording two programs.

When a "STOP" button on the simple-remote control 104 is pressed through a user manipulation during recording of a program, the simple-remote control 104 outputs a remote control code "104" (FIG. 5) corresponding to the "STOP" button. The remote control reception section 203 receives this remote control code, and sends the received remote control code to the application management section 205. By using the remote control code table 301, the application management section 205 recognizes that the user manipulation has been made on the simple-remote control 104. Next, the application management section 205 reads a recording stopping application for the simple-remote control from the program storing section 206, and the program executing section 207 executing that application executes an operation concerning a "STOP" function as programmed.

The recording stopping application for the simple-remote control acquires program additional information 401 which is recorded in the program information recording section 204, and extracts only those pieces of program information whose state of recording 403 has the value "being recorded" and whose remote control flag has the value "simple-remote control". Then, based on the extracted program information, panel data for displaying program information which is being recorded is generated. FIG. 13A to FIG. 13C show examples of panels which display program information. The conditions for displaying the respective panels are as follows.

Condition 1: If recording of two programs is being executed based on an instruction from the simple-remote control 104, a panel shown in FIG. 13A is displayed.

Condition 2: If recording of two programs is being executed based on respective instructions from the simple-remote control and from the full-remote control, a panel shown in FIG. 13B is displayed.

Condition 3: If recording of two programs is being executed based on an instruction from the full-remote control, a panel shown in FIG. 13C is displayed.

In other words, if the remote control reception section 203 receives an instruction to stop recording from the simple-remote control when a program is being recorded based on an instruction from the full-remote control, the program information recording section 204 does not stop recording.

Thus, by allowing only those programs which are being recorded from the simple-remote control to be displayed in the recording stopping application for the simple-remote control, it becomes possible to prevent a user of the simple-remote control from inadvertently stopping the recording of a user of the full-remote control.

Embodiment 4

The present embodiment illustrates a recorder which, when a broadcast program or a recorded program is viewed, introduces different indications depending on whether the manipulation has been rendered on the full-remote control 103 or on the simple-remote control 104. Although the present embodiment is again illustrated on the basis of a recorder, no recording function is particularly required. The recorder according to the present embodiment may well read as a player having only a reproduction function.

Figure 14:
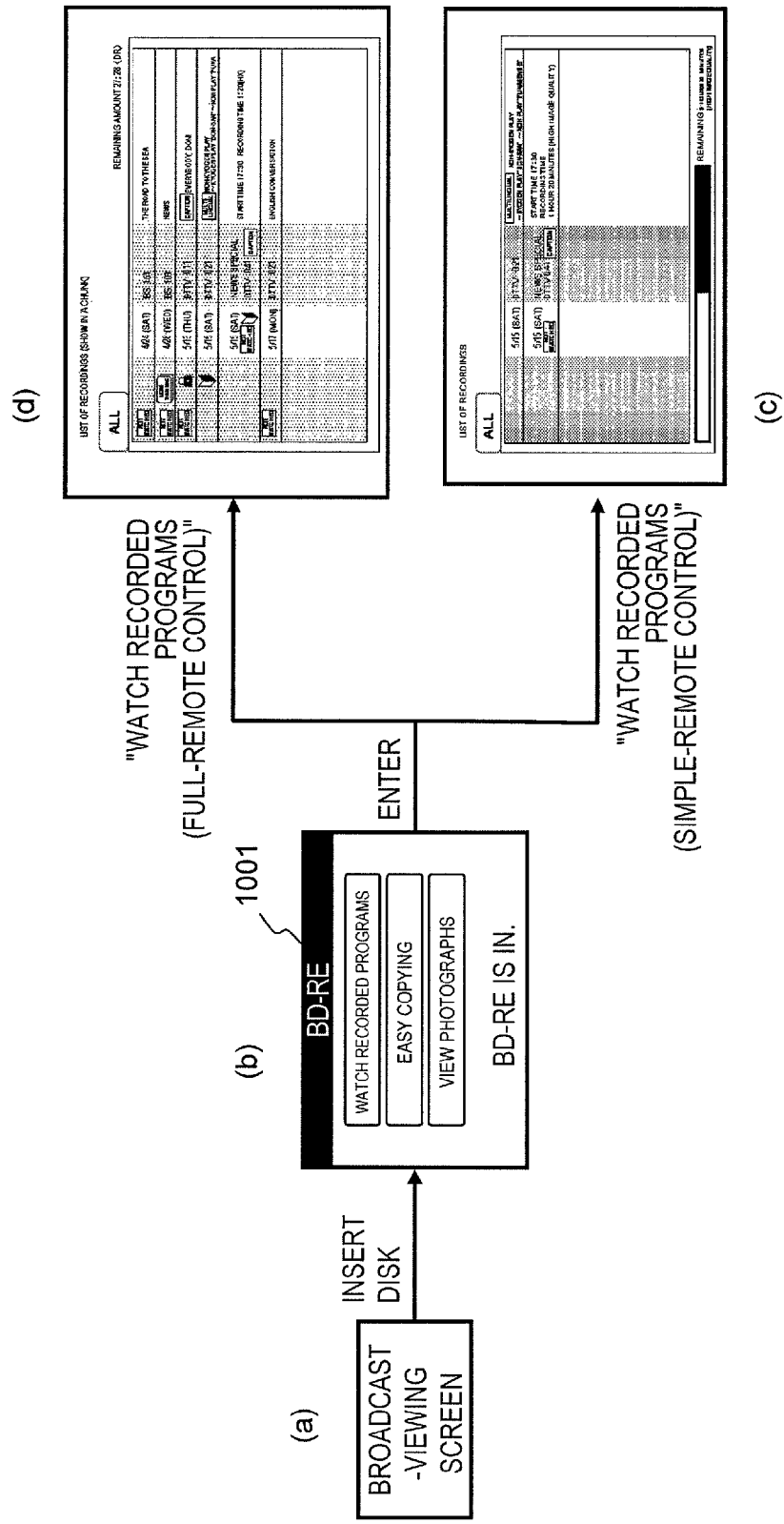
FIG. 14 (a) to (d) are diagrams showing exemplary screen transitions when the process is to be changed depending on the remote control type.

FIGS. 14(*a*) to (*d*) show exemplary screen transitions when the process is to be changed depending on the remote control type. Hereinafter, an example where an external medium such as a BD/DVD, an SD, or a USB is inserted during the viewing of a program (FIG. 14(*a*)) and a program which is stored on that external medium is viewed.

With reference to FIG. 14, the present embodiment will be described.

When the user inserts an external medium, the medium control section 210 detects insertion of the external medium, and notifies the application management section 205 of the result of detection. The application management section 205 automatically displays a guidance panel 1001 from which to activate a list-of-recordings application or the like, irrespective of the remote control manipulation by the user (FIG. 14(*b*)).

In other words, if an external medium is inserted while a broadcast program is being displayed as a broadcast viewing list, the application management section 205 displays the options of "WATCH RECORDED PROGRAMS", "EASY COPYING", and "VIEW PHOTOGRAPHS" as shown in FIG. 14(*b*).

Now, suppose that, while the focus is on "WATCH RECORDED PROGRAMS" in the guidance panel 1001, the "ENTER" button on the simple-remote control 104 is pressed through a user manipulation. The simple-remote control 104 outputs a remote control code "103" (FIG. 5) corresponding to the "ENTER" button. The remote control reception section 203 sends the received remote control code to the application management section 205. By using the remote control code table 301, the application management section 205 recognizes that the user manipulation has been made on the simple-remote control 104. Next, based on the fact that the focus is on the option "WATCH RECORDED PROGRAMS" in the current state, and that the ENTER button has been pressed in that state, the application management section 205 reads the list-of-recordings application for the simple-remote control from the program storing section 206, and the program executing section 207 executes that program. As a result, as shown in FIG. 14(*c*), a list of programs which have been recorded on the external medium is displayed.

Supposed on the other hand that, while the focus is on "WATCH RECORDED PROGRAMS" in the guidance panel 1001, the "ENTER" button on the full-remote control 103 is pressed through a user manipulation. The full-remote control 103 outputs a remote control code corresponding to the "ENTER" button, and the remote control reception section 203 sends the received remote control code to the application management section 205. By using the remote control code table 301, the application management section 205 recognizes that the user manipulation has been made on the full-remote control 104. Thereafter, through a process similar to the process when the simple-remote control is manipulated, the application management section 205 reads a list-of-recordings application for the full-remote control from the program storing section 206, and the program executing section 207 executes that program. As a result, as shown in FIG. 14(*d*), a list of programs which have been recorded on the external medium is displayed.

As described above, when an application is not directly activated with a button on a remote control, e.g., on a panel for application activation that is automatically displayed upon insertion of an external medium, the applications to be activated can be varied based on differences between remote control codes, thereby allowing a user of the simple-remote control to utilize applications for the simple-remote control.

Variants

Hereinafter, variants which are applicable to Embodiments 1 to 4 will be described.

Embodiments 1 to 4 have been illustrated by contemplating remote controls which communicate with the recorder 101 via infrared, as shown in FIG. 2 and FIG. 3. However, it is also possible to control the operation of the recorder 101 by allowing a smartphone to function as remote controls.

Figure 15:
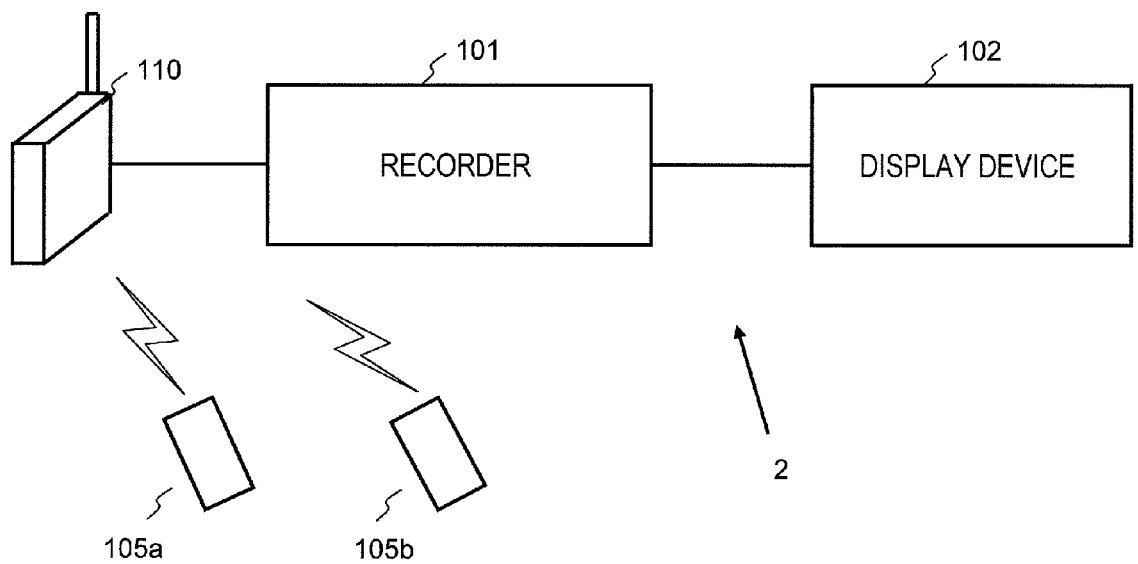
FIG. 15 A diagram showing the construction of a video system 2 according to the present embodiment in the case where a smartphone is used as remote controls.

FIG. 15 shows the construction of a video system 2 according to the present embodiment where a smartphone is used as remote controls. The video system 2 includes a recorder 101, a display device 102, a smartphone 105a, 105b, and an access point 110.

Differences from the construction of FIG. 1 are that the recorder 101 is connected to the access point 110, and that the smartphone 105a, 105b is also wirelessly connected to the access point 110. The access point 110 is a wireless router that is compliant with the Wifi standards, for example. The recorder 101 and the access point 110 are connected via a cable that is compliant with the Ethernet (registered trademark) standards, for example.

Figure 16:
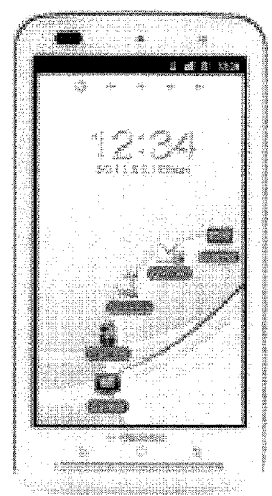
FIG. 16 A diagram showing the example appearance of a smartphone 105a, 105b.

FIG. 16 shows an example appearance of the smartphone 105a, 105b.

Mobile phones, such as smartphones, are capable of being uniquely identified on a communications network, and usually have specified users. Moreover, they can realize various functions depending on the installed applications.

Therefore, by installing remote control applications for manipulating the recorder 101 on a smartphone, that smartphone can be allowed to function as remote controls. Moreover, the recorder 101 is able to identify which smartphone an instruction comes from, thus making it possible to change the indication depending on the user of each smartphone. Therefore, it is easier to provide appropriate indications for each individual than in a case where e.g. three or more people share two types of remote controls, i.e., a full-remote control and a simple-remote control, thus reducing the possibilities of inadvertently altering or deleting recorded programs or scheduled recordings.

When using a smartphone, the full-remote control 103 or the simple-remote control 104 in each of Embodiments 1 to 4 may be replaced with the smartphone 105a or 105b. Once each smartphone sends a remote control code, the recorder 101 can distinguish that remote control code. The details of the process have already been described and are omitted here.

In order to distinguish itself from the others, each smartphone sends a user ID, separately from the remote control codes. By utilizing this user ID, the recorder 101 is able to recognize which smartphone an instruction comes from. In other words, the user ID can also be called a device ID. The user ID may be arbitrarily set by the user, for example, or a number that is unique to each smartphone (e.g., a MAC address or a telephone number) may be used. In the case where a MAC address is used as the user ID (device ID), for example, the recorder 101 is able to acquire the MAC address of a device on the network based on standard specifications such as UPnP.

A remote control application on the smartphone may send the user ID every time a remote control code is sent. Alternatively, a remote control application on the smartphone may send the user ID only once in the beginning, and thereafter may send a remote control code alone.

Each smartphone user can choose in advance whether he or she desires the same indications as those available in using the full-remote control 103 of Embodiments 1 to 4 or the same indications as those available in using the simple-remote control 104, when any manipulation is made on their own smartphone. Once a setting concerning which remote control it is to be operated as is made, thereafter, the particulars thereof and the MAC address of that smartphone are stored in association in the recorder 101. As a result of this, each smartphone user can allow their own smartphone to function as the full-remote control 103 or the simple-remote control 104 of Embodiments 1 to 4 described above.

For increased convenience, a nickname may be given to the MAC address of a smartphone on a setting screen or the like. For example, for the recorder 101 being shared by a family, an indication "DAD" may be made for any manipulation on the father's smartphone, or an indication "MOM" may be made for any manipulation on the mother's smartphone. The recorder 101 may convert the value of any remote control flag described in the above embodiments into such a nickname.

Note that the aforementioned smartphone is an example of a computer device. Without being limited to smartphones, anything may be used on which an application capable of manipulating the recorder 101 is installed and which is capable of wired or wireless communications with the recorder 101. For example, a PDA or a portable music player satisfying such requirements may be used.

Note that the remote controls of Embodiments 1 to 4 and smartphones may be mixedly used.

Note that the smartphone 105a or 105b may directly communicate with the recorder 101, i.e., not via the access point 110.

Note that, when an alteration process is made to a program in whose program additional information 401 the remote control flag has the value "simple-remote control", the alteration process being performed by an application for the full-remote control through a manipulation of the full-remote control, the remote control flag value in the program additional information 401 may be updated to "full-remote control". Examples of alteration processes are shown below.

1. Modify particulars of scheduling in a list of scheduled items for the full-remote control 2. In a list of recordings for the full-remote control, combine program data and edit them into one program In the case where a scheduling application for scheduling registration of programs is provided for the simple-remote control, the remaining amount calculation at the time of scheduling registration may be conducted by the remaining amount calculation method described in Embodiment 1 with reference to FIG. 9.

Although the above embodiments describe examples where a listing when using the full-remote control 103 and a listing when using the simple-remote control 104 are of different substances, these are only exemplary. The present invention encompasses any recorder that can suppress erroneous manipulations of one who is not accustomed with manipulation on the basis of a difference between the operation when using the full-remote control 103 and the operation when using the simple-remote control 104. For example, the present invention encompasses a recorder which performs an audio guidance operation when the simple-remote control 104 is used and which does not perform an audio guidance operation when the full-remote control 103 is used. The audio guidance may be, for example, the program name, the date and time of broadcast, the channel number, and whether the program has been recorded by using the full-remote control or recorded by using the simple-remote control. Moreover, the audio guidance may include a method of starting play back, a method of deleting recorded program, a method of deleting scheduled recording setting, or a method of canceling manipulation. When guiding along the method of deleting recorded program, an audio guidance for the method of canceling manipulation may also be provided, whereby a user who is not accustomed with manipulation is prevented from inadvertently deleting the recorded programs or scheduled recordings of another person. Thus, even if programs of another person are being displayed within a list of recorded programs, the other person's programs, of which one does not recall recording, are prevented from being deleted.

Moreover, the above embodiments describe examples where the operation of the recorder is independently controlled by using the full-remote control 103 and the simple-remote control 104. It was assumed that the full-remote control 103 and the simple-remote control 104 have independent housings (for example, FIG. 1). However, such implementations are exemplary. A full-remote control function and a simple-remote control function may both be provided on a single remote control. A remote control which operates as either the full-remote control 103 or the simple-remote control 104 by selectively switching between the full-remote control function and the simple-remote control function with a button, for example, may be used.

Figure 17:
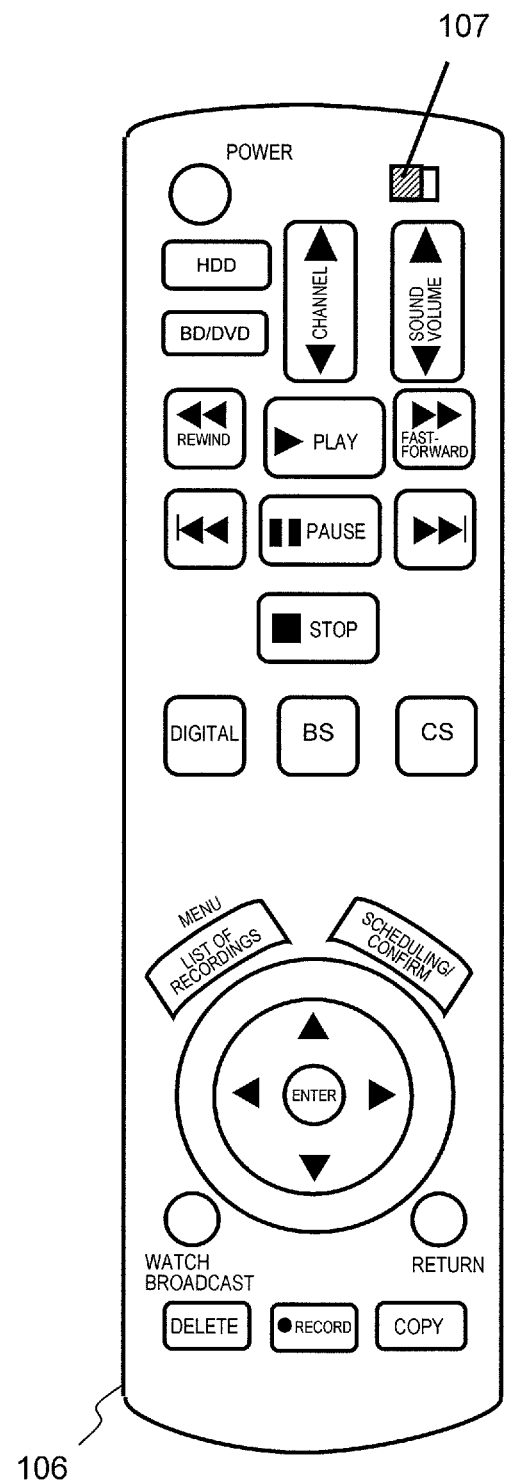
FIG. 17 A diagram showing an exemplary construction of a remote control 106 having a switchable full-remote control function and simple-remote control function.

FIG. 17 shows an exemplary construction of a remote control 106 having a switchable full-remote control function and simple-remote control function. A switch 107 switches between the full-remote control function and the simple-remote control function, so that either one of the functions is selected. For example, when the switch 107 is in a position shown in FIG. 17, the remote control 106 functions as a full-remote control.

When the remote control 106 is set to the full-remote control function, the recorder 101 is manipulatable by using all buttons on the remote control 106. On the other hand, when the switch 107 is slid to the right side so that the remote control 106 is set to function as a simple-remote control, the recorder 101 is manipulatable only by using less than all buttons on the remote control 106. The less-than-all buttons may be, for example, a POWER button, a PLAY button, a REWIND button, a FAST-FORWARD button, a STOP button, a LIST OF RECORDINGS button, a CONFIRM SCHEDULING button, a WATCH BROADCAST button, a RETURN button, UP/DOWN/RIGHT/LEFT buttons, an ENTER button, a DELETE button, a RECORD button, and a COPY button.

The remote control codes and the operation of the recorder 101 when the remote control 106 is set to the full-remote control function are identical to those in the above embodiments. Moreover, the remote control codes and the operation of the recorder 101 when the remote control 106 is set to the simple-remote control function are also identical to those in the above embodiments. Therefore, their descriptions are omitted.

Note that, if any button that is not to be used under the simple-remote control function is pressed while the remote control 106 is set to the simple-remote control function, it may automatically switch to the full-remote control function.

Without providing a switching function in the remote control 106, the remote control 106 may be allowed to have both of buttons for operation as the full-remote control and buttons for operation as the simple-remote control.

As a result, a single remote control can execute the operation as the full-remote control and the operation as the simple-remote control.

Moreover, applications for allowing a smartphone to function as the full-remote control and applications for allowing it to function as the simple-remote control may be prepared, and depending on which applications the user installs, the single smartphone can be allowed to function as the full-remote control or the simple-remote control. The smartphone may need to be able to send remote control codes corresponding to the full-remote control or remote control codes corresponding to the simple-remote control, but does not need to send the aforementioned user ID (device ID). As a result, the smartphone functions as the full-remote control 103 or the simple-remote control 104 in the above embodiments.

Note that the full-remote control or the simple-remote control according to embodiments of the present invention can be implemented by using a so-called universal remote control. In this case, the user may allow the universal remote control to learn the remote control signals which are sent from a full-remote control and/or a simple-remote control. Alternatively, the manufacturer of a universal remote control may provide some parameters in advance, for example, and the user may acquire those parameters via the Internet or the like and set them in the universal remote control. The parameters having been set, the universal remote control is able to send remote control codes of the full-remote control or the remote control codes of the simple-remote control.

The number of programs that the recorder 101 is capable of simultaneously recording is not limited to two.

Figure 18:
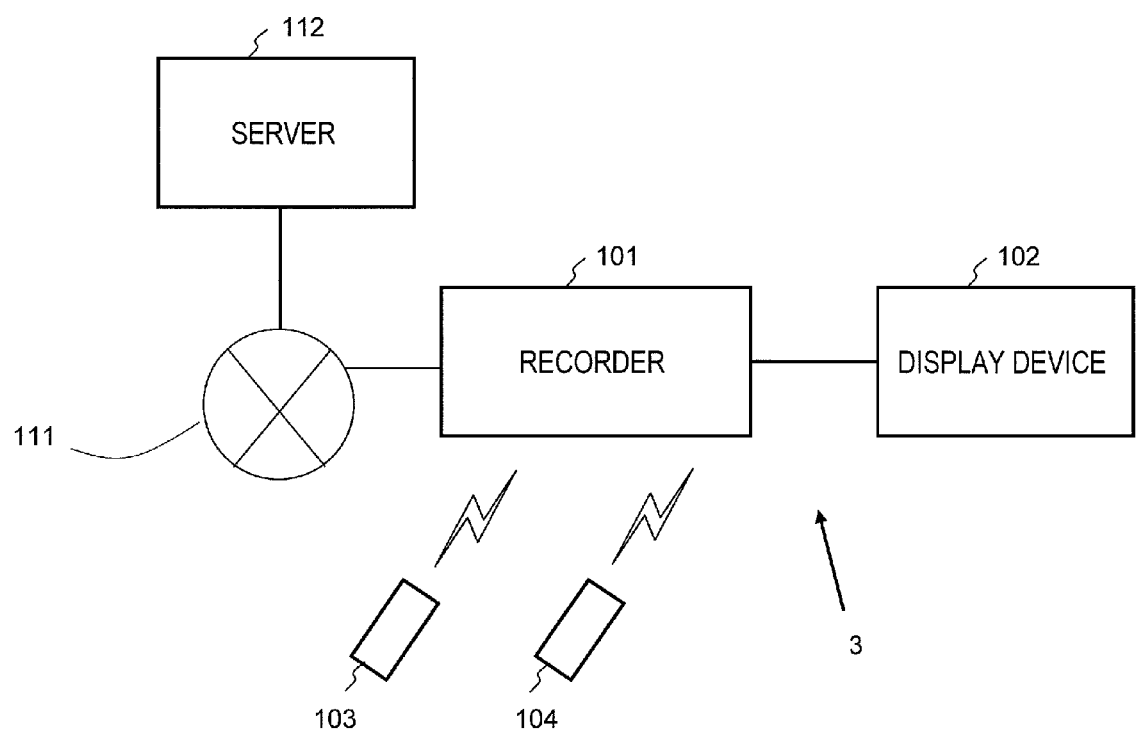
FIG. 18 A diagram showing the construction of a content distribution system 3.

The recorder 101 is not limited to recording broadcast programs, but may also handle program contents and program additional information which are distributed via the Internet or cable circuits. For example, FIG. 18 shows the construction of a content distribution system 3. In the distribution system 3, the recorder 101 communicates with a server 112 via a network 111. The recorder 101 may acquire a content from the server 112, and displays the acquired content on a display device 102.

Although FIG. 18 illustrates the recorder 101 as being capable of recording content-related information, no such recording function and no constituent element corresponding to that function (the program information recording section 204 in FIG. 4) are required in this example. The reason is that, in a so-called cloud service, only the server 112 being connected to the network 111 would need to have the function of recording and accumulating content data. As a result, any content that corresponds to the "content-related information" described in connection with FIG. 1 will be recorded on a storage medium which is kept under management by the server 112 connected to the network 111. As will be understood from the above description, a player may be provided instead of the recorder 101 in the exemplary construction of FIG. 18.

The operations of the recorder 101 in connection with the remote controls 103 and 104 are identical to those in the above embodiments. Therefore, their descriptions are omitted.

Without being limited to a BD recorder with an internal HDD, the recorder 101 may be any digital home appliance having the function of recording or playing back programs, such as a digital television set, a set-top box, a mobile phone, a car navigation system, or a mobile AV terminal.

Moreover, the present invention may be a computer-readable storage medium, e.g., a hard disk, a CD, a DVD (DVD-ROM, DVD-RAM, DVD-RW, DVD-R, DVD+R, etc.), a BD (BD-ROM, BDRE, BD-R, etc.), a semiconductor memory (SD, USB, etc.), or the like having a computer program or a digital signal recorded thereon. Alternatively, it may be the computer program or digital signal recorded on any such storage medium.

Moreover, the present invention may be a computer program or a digital signal being transmitted over telecommunication lines, wireless or wired communication lines, a network such as the Internet, or the like.

Moreover, the present invention may be a computer system having a microprocessor and a memory, the memory storing the aforementioned computer program, and the microprocessor operating in accordance with the computer program.

Moreover, it may be transported in the form of a program or a digital signal recorded on a storage medium, or transported via a network or the like as a program or a digital signal, for execution on another independent computer system.

The aforementioned embodiments and the variants may each be combined with one another.

INDUSTRIAL APPLICABILITY

The present invention is applicable to a recording apparatus or reproduction apparatus which is controllable with a plurality of remote controls.

REFERENCE SIGNS LIST 101 recorder
102 display device
103 full-remote control
104 simple-remote control
106 remote control
107 switch
202 broadcast data receiving section
203 remote control reception section
204 program information recording section
205 application management section
206 program storing section
207 program executing section
208 AV input/output section
209 AV stream control section
210 medium control section
220 processor
301 remote control code table
401 program additional information
402 remote control flag
403 state of recording
502 indication of remaining amount
702 indication of remaining amount

The invention claimed is:

1. A data processing apparatus comprising:
a reception section configured to receive a first remote control signal sent from a first remote control having buttons provided on a surface thereof and a second remote control signal sent from a second remote control having a smaller number of buttons provided on a surface thereof than on the first remote control;
a processor configured to generate image data representing a list of contents by using, from a storage medium on which content-related information is recorded, the content-related information being read from the storage medium, such that image data representing a different list of contents is generated depending on whether the first remote control signal is received or the second remote control signal is received; and
an output section configured to output the image data representing the list of contents.

2. The data processing apparatus of claim 1, wherein the processor,
when the first remote control signal is received, generates the image data representing the list of contents by using information which is recorded based on a manipulation of the first remote control and a manipulation of the second remote control, and
when the second remote control signal is received, generates the image data representing the list of contents by using information which is recorded based on a manipulation of the second remote control, from within the content-related information recorded on the storage medium.

3. The data processing apparatus of claim 2, wherein, data of at least one content is recorded on the storage medium as the content-related information; and
the processor generates image data representing a list of recorded contents.

4. The data processing apparatus of claim 3, wherein, when the storage medium contains a content which is recorded based on a manipulation of the second remote control,
the processor having received the first remote control signal generates image data distinguishably indicating that the content has been recorded based on a manipulation of the second remote control.

5. The data processing apparatus of claim 3, wherein, the processor
calculates information concerning an available remaining amount based on a total capacity and a used capacity of the storage medium, and
when the first remote control signal is received, generates text information concerning the remaining amount, together with the image data representing the list of contents, and
when the second remote control signal is received, generates image data representing information concerning the remaining amount, together with the image data representing the list of contents generated by using the information which is recorded based on a manipulation of the second remote control.

6. The data processing apparatus of claim 5, wherein the processor generates image data of a graph representing the information concerning the remaining amount.

7. The data processing apparatus of claim 1, further comprising a recording section configured to record a content onto the storage medium, wherein,
during a period in which the recording section is recording a content onto the storage medium based on a manipulation of the first remote control, if the reception section receives a second remote control signal from the second remote control concerning a manipulation of stopping the recording of the content, the recording section does not stop the recording of the content.

8. The data processing apparatus of claim 7, wherein, during a period in which the recording section is recording a content onto the storage medium based on a manipulation of the first remote control, if the reception section receives a second remote control signal from the second remote control concerning a manipulation of stopping the recording of the content, the processor generates image data indicating that the recording of the content is not stoppable.

9. The data processing apparatus of claim 2, wherein, scheduling information for scheduled recording of a content is recorded on the storage medium as the content-related information; and the processor generates image data representing a list of scheduled recording of contents.

10. The data processing apparatus of claim 9, wherein, when the storage medium contains scheduling information which is recorded based on a manipulation of the second remote control,
the processor having received the first remote control signal generates image data distinguishably indicating that the scheduling information has been recorded based on a manipulation of the second remote control.

11. The data processing apparatus of claim 1, wherein the storage medium is a storage medium which is removable from the data processing apparatus.

12. The data processing apparatus of claim 1, wherein at least one of the first remote control and the second remote control is a computer device having installed therein an application which enables manipulation of the data processing apparatus, the computer device being capable of communicating with the data processing apparatus.

13. The data processing apparatus of claim 1, wherein,
from a respective computer device, the reception section receives identification information making the computer device uniquely identifiable and a remote control signal; and
by using the identification information, the processor determines whether the first remote control signal is received or the second remote control signal is received.

14. The data processing apparatus of claim 1, wherein,
the data processing apparatus is connected to a server via a network, the server keeping under management a storage medium on which the content-related information is recorded; and
the processor generates the image data by using the content-related information read from the storage medium by the server.

15. A data processing apparatus, comprising:
a reception section configured to receive a remote control signal from a remote control which is switchable between a first remote control function of functioning as a first remote control and a second remote control function of functioning as a second remote control, the reception section receiving a first remote control signal that is sent while the first remote control function is selected and a second remote control signal that is sent while the second remote control function is selected;
a processor configured to generate image data representing a list of contents by using, from a storage medium on which content-related information is recorded, the content-related information being read from the storage medium, such that image data representing a different list of contents is generated depending on whether the first remote control signal is received or the second remote control signal is received; and
an output section configured to output the image data representing the list of contents.

* * * * *